United States Patent
Noda et al.

(10) Patent No.: US 9,746,650 B2
(45) Date of Patent: *Aug. 29, 2017

(54) ZOOM LENS AND IMAGING APPARATUS

(71) Applicant: FUJIFILM Corporation, Tokyo (JP)

(72) Inventors: Taiga Noda, Saitama (JP); Ryoko Tomioka, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,098

(22) Filed: Nov. 27, 2015

(65) Prior Publication Data

US 2016/0154222 A1 Jun. 2, 2016

(30) Foreign Application Priority Data

Dec. 2, 2014 (JP) .................................. 2014-243847

(51) Int. Cl.
| | |
|---|---|
| *G02B 15/173* | (2006.01) |
| *G02B 15/14* | (2006.01) |
| *G02B 15/20* | (2006.01) |
| *G02B 15/163* | (2006.01) |
| *G02B 27/64* | (2006.01) |

(52) U.S. Cl.
CPC .......... *G02B 15/173* (2013.01); *G02B 15/14* (2013.01); *G02B 15/163* (2013.01); *G02B 15/20* (2013.01); *G02B 27/646* (2013.01)

(58) Field of Classification Search
CPC .... G02B 15/163; G02B 15/173; G02B 15/14; G02B 15/20; G02B 27/646

USPC .................................................. 359/676, 683
See application file for complete search history.

(56) References Cited

U.S. PATENT DOCUMENTS

| | | | | |
|---|---|---|---|---|
| 2014/0139720 | A1* | 5/2014 | Ogata .................. | G02B 15/173 348/345 |
| 2014/0354857 | A1* | 12/2014 | Kato .................... | G02B 15/173 348/240.3 |
| 2014/0368699 | A1* | 12/2014 | Morooka ........... | H04N 5/23296 348/240.2 |

(Continued)

FOREIGN PATENT DOCUMENTS

| | | |
|---|---|---|
| JP | S61-286813 A | 12/1986 |
| JP | 2003-287681 A | 10/2003 |

(Continued)

*Primary Examiner* — Jordan Schwartz
(74) *Attorney, Agent, or Firm* — Studebaker & Brackett PC

(57) ABSTRACT

A zoom lens is constituted by, in order from the object side: a positive first lens group; a negative second lens group; a positive third lens group; a negative fourth lens group; and a positive fifth lens group. The distance between the first and second lens groups constantly increases, the distance between the second and third lens groups constantly decreases, the distance between the third and fourth lens groups constantly changes, and the distance between the fourth and fifth lens groups constantly increases when changing magnification from the wide angle end to the telephoto end. The first lens group is constituted by three lenses, which are negative, positive, and positive in order from the object side. The second lens group is constituted by five lenses, which are negative, negative, positive, positive, and negative in order from the object side. The fifth lens group is constituted by a single lens component.

19 Claims, 8 Drawing Sheets

(56) References Cited

U.S. PATENT DOCUMENTS

2014/0376102 A1* 12/2014 Ichikawa ............. G02B 15/173
 359/683
2016/0154221 A1* 6/2016 Noda ................... G02B 15/173
 359/683
2016/0154225 A1* 6/2016 Noda ..................... G02B 15/20
 359/684

FOREIGN PATENT DOCUMENTS

| | | |
|---|---|---|
| JP | 2013-182246 A | 9/2013 |
| JP | 2014-102526 A | 6/2014 |

* cited by examiner

FIG.5
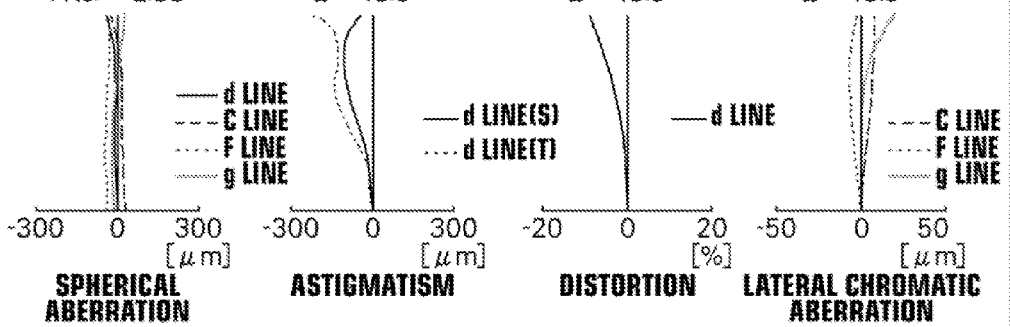
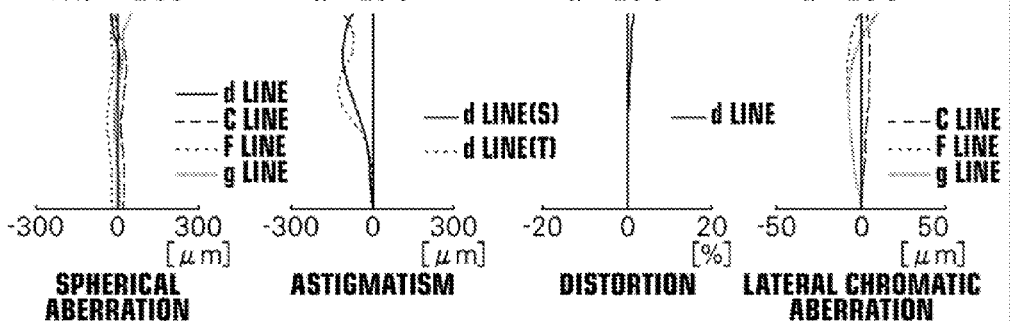
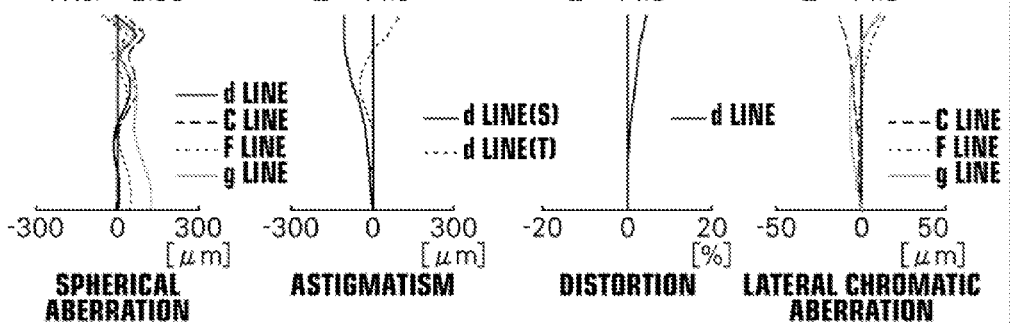

FIG.6
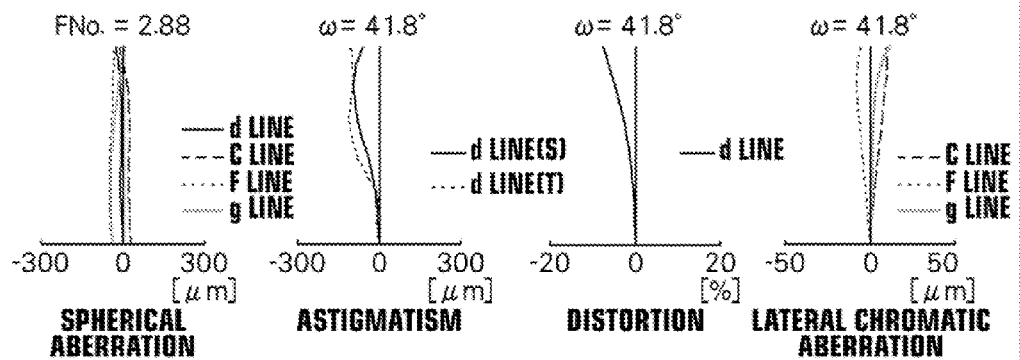
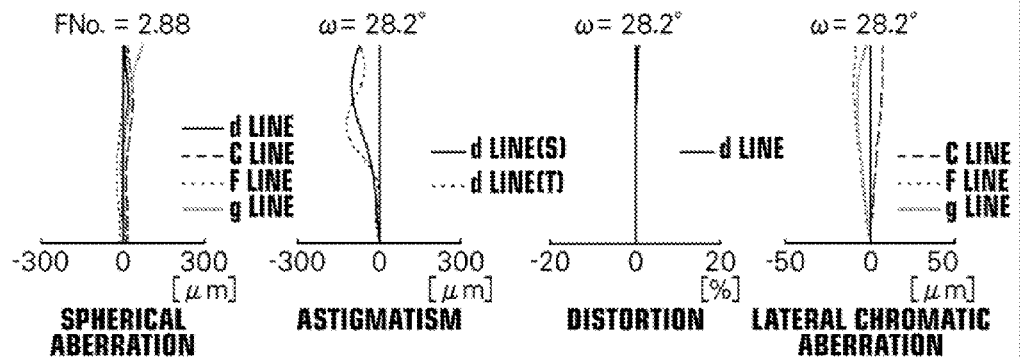
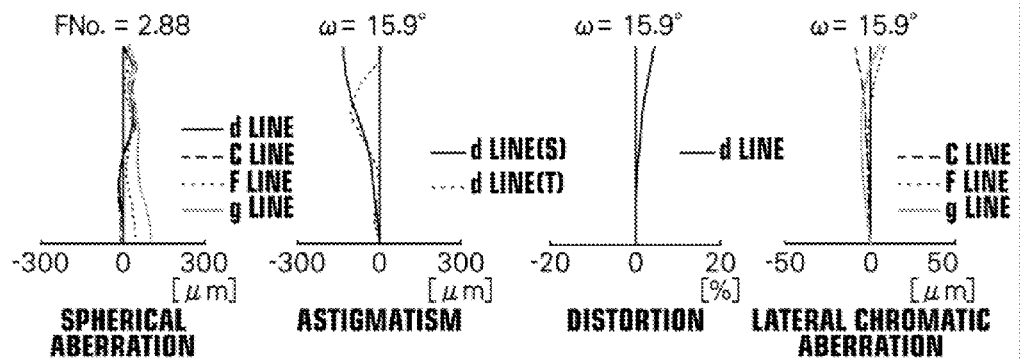

FIG.7
EXAMPLE 3
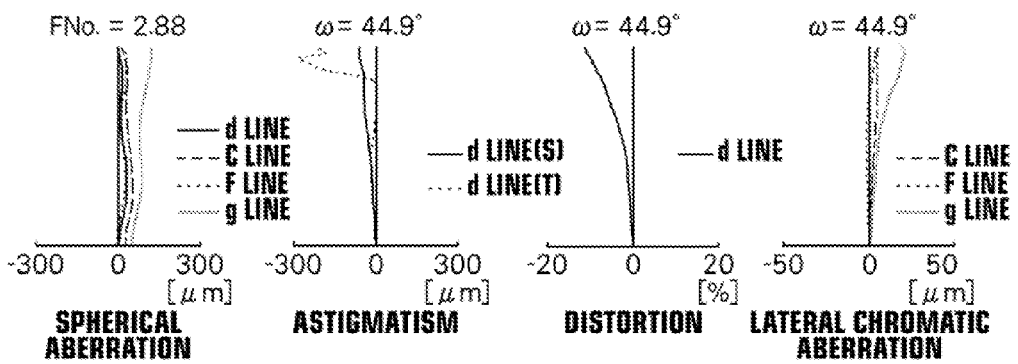
WIDE ANGLE END
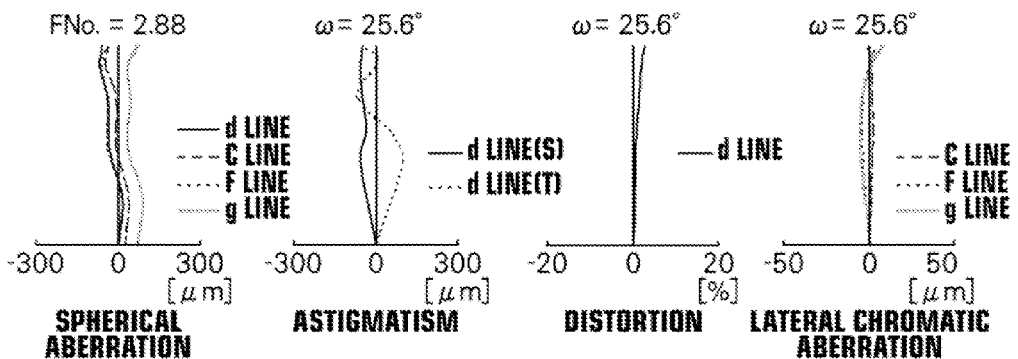
INTERMEDIATE
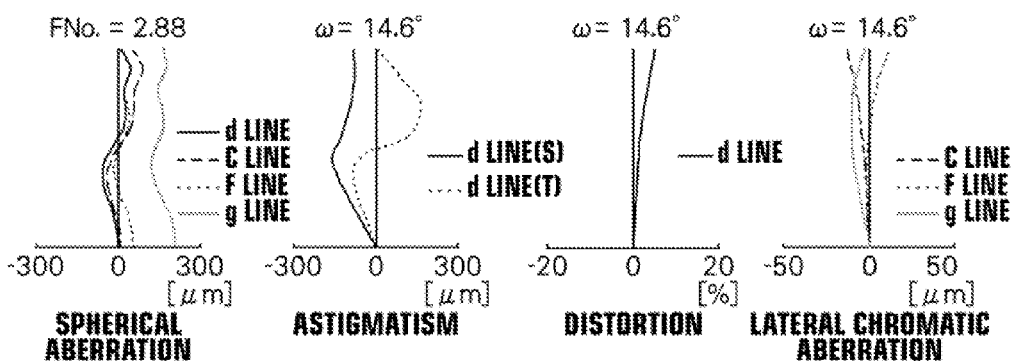
TELEPHOTO END

ZOOM LENS AND IMAGING APPARATUS

CROSS REFERENCE TO RELATED APPLICATIONS

The present application claims priority under 35 U.S.C. §119 to Japanese Patent Application No. 2014-243847 filed on Dec. 2, 2014. The above application is hereby expressly incorporated by reference, in its entirety, into the present application.

BACKGROUND

The present disclosure is related to a zoom lens which is particularly favorably suited for use in digital cameras, interchangeable lens digital cameras, and cinematic cameras. The present disclosure is also related to an imaging apparatus equipped with the zoom lens.

Zoom lenses having five group configurations for use in digital cameras, interchangeable lens digital cameras, and cinematic cameras are known, as disclosed in Japanese Unexamined Patent Publication Nos. 2003-287681, 61(1986)-286813, 2014-102526, and 2013-182246.

SUMMARY

Recently, the number of pixels in digital cameras, interchangeable lens digital cameras, and cinematic cameras is increasing. Therefore, there is demand for a high performance lens, which is compatible with the increased number of pixels, and that favorably corrects various aberrations, as a zoom lens to be employed in these cameras.

In addition, there is demand for the above zoom lens to have a small F value even at the telephoto end. Particularly in so called standard zoom lenses that have zoom ranges that include a focal length of 50 mm as a 135 film converted value, there is high demand for a zoom lens having a small F value even at the telephoto end, from the viewpoint of expressivity in photography. In addition, there is demand for a wider angle of view at the wide angle end.

However, the zoom lenses of Japanese Unexamined Patent Publication Nos. 2003-287681, 61(1986)-286813, and 2014-102526 have large F values at the telephoto end, and it also cannot be said that the performance thereof with respect to correcting aberrations is sufficiently high. Further, the full angles of view of these zoom lenses at the wide angle end are less than 80°, and it cannot be said that these angles of view are wide.

In addition, in the zoom lens of Japanese Unexamined Patent Publication No. 2013-182246, a fifth lens group moves forward such that the distance between a fourth lens group and the fifth lens group decreases when changing magnification. However, in zoom lenses of the type in which a fifth lens group moves forward, the heights of principal light rays that pass through the fifth lens group become low at the telephoto end. Therefore, distortion and blue chromatic aberration shift to the plus side at the telephoto end. This is the same direction as the tendency of a second lens group that bears the primary magnification changing function. Therefore, the burden of suppressing fluctuations in aberration between the wide angle end and the telephoto end is great. For this reason, there is a tendency that correction of aberrations becomes insufficient at intermediate focal lengths.

The present disclosure has been developed in view of the foregoing circumstances. The present disclosure provides a zoom lens having a wide angle of view at the wide angle end, a small F value throughout the entire zoom range, which favorably corrects various aberrations. The present disclosure also provides an imaging apparatus equipped with such a zoom lens.

A zoom lens of the present disclosure consists of, in order from the object side to the image side:

a first lens group having a positive refractive power;
a second lens group having a negative refractive power;
a third lens group having a positive refractive power;
a fourth lens group having a negative refractive power; and
a fifth lens group having a positive refractive power;

the distance between the first lens group and the second lens group constantly increasing, the distance between the second lens group and the third lens group constantly decreasing, the distance between the third lens group and the fourth lens group constantly changing, and the distance between the fourth lens group and the fifth lens group constantly increasing when changing magnification from the wide angle end to the telephoto end;

the first lens group consisting of, in order from the object side to the image side, a 1-1 negative lens, a 1-2 positive lens, and a 1-3 positive lens;

the second lens group consisting of, in order from the object side to the image side, a 2-1 negative meniscus lens having a concave surface toward the image side, a 2-2 negative lens, a 2-3 positive lens, a 2-4 positive lens, and a 2-5 negative lens; and the fifth lens group consisting of a single lens component.

Here, the expression "lens component" refers to a lens having only a surface toward the object side and a surface toward the image side as two surfaces that contact air along the optical axis. The expression "single lens component" refers to a one single lens or one set of lenses that form a cemented lens.

In the zoom lens of the present disclosure, it is preferable for Conditional Formula (1) below to be satisfied. Note that it is more preferable for Conditional Formula (1-1) below to be satisfied.

$$-0.9 < (L11f - L12r)/(L11f + L12r) < -0.1 \tag{1}$$

$$-0.5 < (L11f - L12r)/(L11f + L12r) < -0.12 \tag{1-1}$$

wherein L11f is the paraxial radius of curvature of the surface of the 1-1 negative lens toward the object side, and L12r is the paraxial radius of curvature of the surface of the 1-2 positive lens toward the image side.

In addition, it is preferable for the third lens group to consist of four positive lenses, two negative lenses, and an aperture stop.

In addition, it is preferable for the third lens group to consist of, in order from the object side to the image side, a 3-1 positive lens, an aperture stop, a 3-2 cemented lens having a positive combined refractive power, a 3-3 cemented lens having a negative combined refractive power, and a 3-4 positive lens.

In addition, it is preferable for the 3-2 cemented lens to be formed by cementing a negative lens and a biconvex lens, provided in this order from the object side to the image side, together.

In addition, it is preferable for the 3-3 cemented lens to be formed by cementing a positive meniscus lens having a convex surface toward the image side and a biconcave lens, provided in this order from the object side to the image side, together.

In addition, it is preferable for Conditional Formula (2) below to be satisfied. Note that it is more preferable for Conditional Formula (2-1) below to be satisfied.

$$0.15 < f2/L22f < 1 \quad (2)$$

$$0.2 < f2/L22f < 0.7 \quad (2\text{-}1)$$

wherein f2 is the paraxial focal length of the second lens group with respect to the d line, and L22f is the paraxial radius of curvature of the surface of the 2-2 negative lens toward the object side.

In addition, it is preferable for Conditional Formula (3) below to be satisfied. Note that it is more preferable for Conditional Formula (3-1) below to be satisfied.

$$0.6 < f2/f21 < 1.3 \quad (3)$$

$$0.7 < f2/f21 < 1.1 \quad (3\text{-}1)$$

wherein f2 is the paraxial focal length of the second lens group with respect to the d line, and f21 is the paraxial focal length of the 2-1 negative lens with respect to the d line.

In addition, it is preferable for Conditional Formula (4) below to be satisfied in the case that the third lens group is constituted by the 3-1 positive lens, the aperture stop, the 3-2 cemented lens, the 3-3 cemented lens, and the 3-4 positive lens as described above. Note that it is more preferable for Conditional Formula (4-1) below to be satisfied.

$$0.7 < f3/f34 < 1.6 \quad (4)$$

$$0.9 < f3/f34 < 1.5 \quad (4\text{-}1)$$

wherein f3 is the paraxial focal length of the third lens group with respect to the d line, and f34 is the paraxial focal length of the 3-4 positive lens with respect to the d line.

In addition, it is preferable for Conditional Formula (5) below to be satisfied. Note that it is more preferable for Conditional Formula (5-1) below to be satisfied.

$$0.2 < f3/f31 < 1.5 \quad (5)$$

$$0.3 < f3/f31 < 1.2 \quad (5\text{-}1)$$

wherein f3 is the paraxial focal length of the third lens group with respect to the d line, and f31 is the paraxial focal length of the 3-1 positive lens with respect to the d line.

In addition, it is preferable for the fifth lens group to be fixed with respect to an imaging surface when changing magnification.

In addition, it is preferable for the fifth lens group to consist of a single lens, and for Conditional Formula (6) below to be satisfied. Note that it is more preferable for Conditional Formula (6-1) below to be satisfied.

$$15 < vd5 < 40 \quad (6)$$

$$16 < vd5 < 38 \quad (6\text{-}1)$$

wherein vd5 is the Abbe's number of the single lens with respect to the d line.

In addition, it is preferable for Conditional Formula (7) below to be satisfied. Note that it is more preferable for Conditional Formula (7-1) below to be satisfied.

$$20 < vd31 < 40 \quad (7)$$

$$25 < vd31 < 35 \quad (7\text{-}1)$$

wherein vd31 is the Abbe's number of the 3-1 positive lens with respect to the d line.

In addition, it is preferable for only the fourth lens group to be moved to perform focusing operations.

An imaging apparatus of the present disclosure is equipped with the zoom lens of the present disclosure.

Note that the expression "consists of" means that the zoom lens of the present disclosure may also include lenses that practically have no power, optical elements other than lenses such as an aperture stop, a mask, a cover glass, and filters, and mechanical components such as lens flanges, a lens barrel, an imaging element, a camera shake correcting mechanism, etc., in addition to the constituent elements listed above.

In addition, the surface shapes of lenses as well as the signs of the refractive powers of lenses are those which are considered in the paraxial region for lenses that include aspherical surfaces.

The zoom lens of the present disclosure consists of, in order from the object side to the image side: the first lens group having a positive refractive power; the second lens group having a negative refractive power; the third lens group having a positive refractive power; the fourth lens group having a negative refractive power; and the fifth lens group having a positive refractive power. The distance between the first lens group and the second lens group constantly increases, the distance between the second lens group and the third lens group constantly decreases, the distance between the third lens group and the fourth lens group constantly changes, and the distance between the fourth lens group and the fifth lens group constantly increases when changing magnification from the wide angle end to the telephoto end. The first lens group consists of, in order from the object side to the image side, the 1-1 negative lens, the 1-2 positive lens, and the 1-3 positive lens. The second lens group consists of, in order from the object side to the image side, the 2-1 negative meniscus lens having a concave surface toward the image side, the 2-2 negative lens, the 2-3 positive lens, the 2-4 positive lens, and the 2-5 negative lens. The fifth lens group consists of a single lens component. Therefore, it is possible for the zoom lens to be that which has a wide angle of view at the wide angle end, a small F value throughout the entire zoom range, and favorably corrects various aberrations.

The imaging apparatus of the present disclosure is equipped with the zoom lens of the present disclosure. Therefore, the imaging apparatus can obtain images having wide angles of view, which are bright and have high image quality.

BRIEF DESCRIPTION OF THE DRAWINGS

FIG. 5 is a collection of diagrams that illustrate aberrations of the zoom lens of Example 1.

FIG. 6 is a collection of diagrams that illustrate aberrations of the zoom lens of Example 2.

FIG. 7 is a collection of diagrams that illustrate aberrations of the zoom lens of Example 3.

DETAILED DESCRIPTION OF THE PREFERRED EMBODIMENTS

Figure 1:
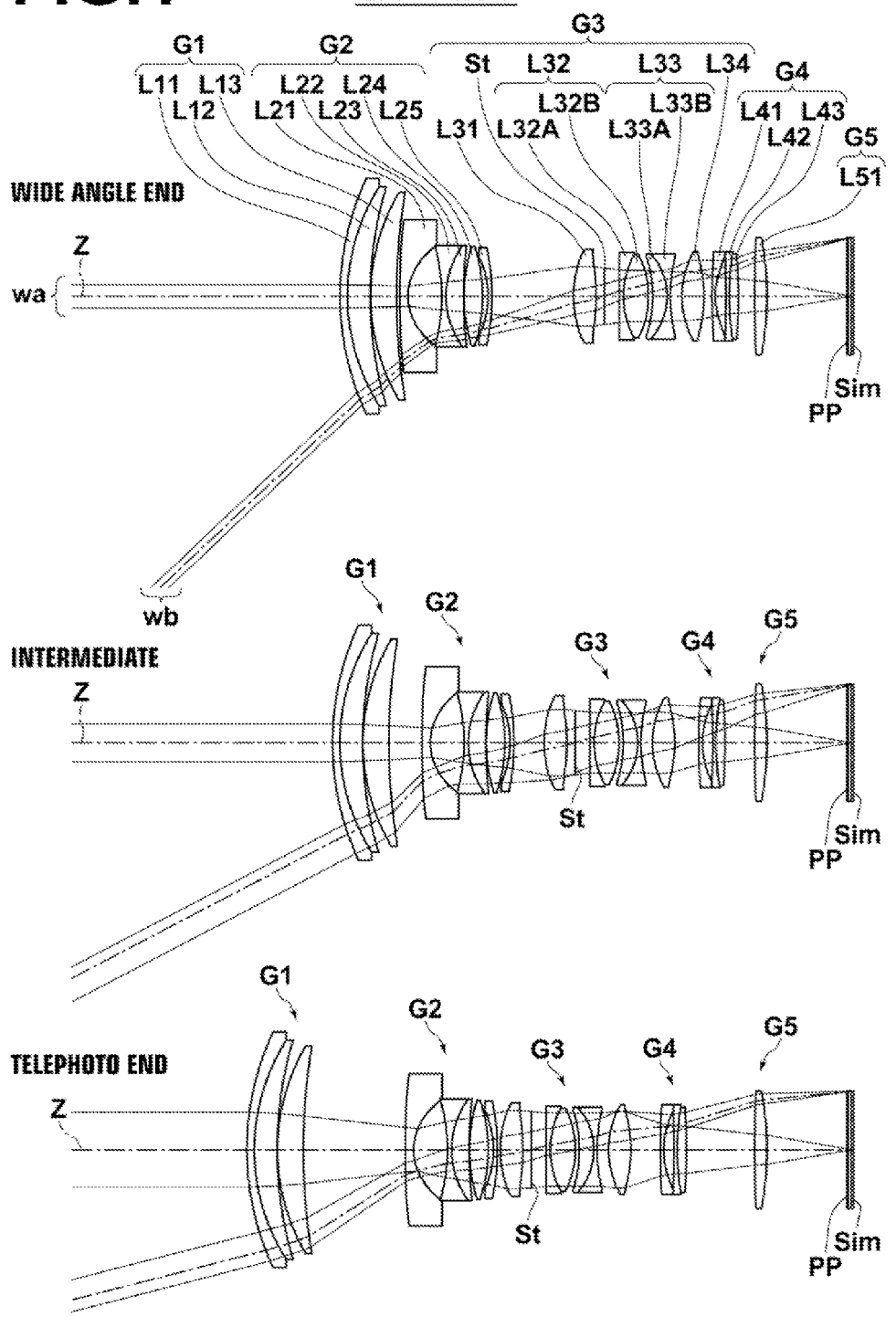
FIG. 1 is a collection of sectional diagrams that illustrate a first example of the configuration of a zoom lens according to an embodiment of the present disclosure (which is common with Example 1).
Figure 4:
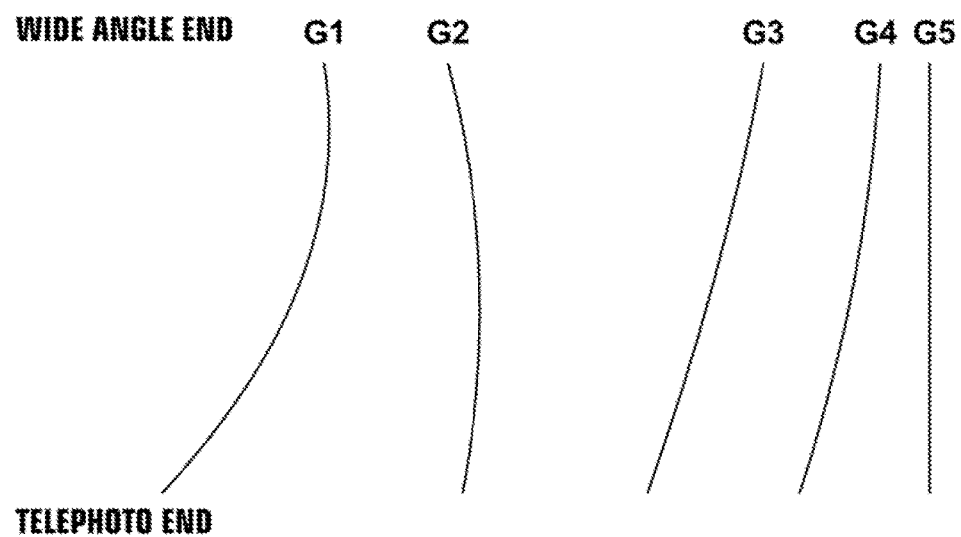
FIG. 4 is a diagram that illustrates the trajectories of movement when changing magnification in a zoom lens according to an embodiment of the present disclosure.

Hereinafter, embodiments of the present disclosure will be described in detail with reference to the attached drawings. FIG. 1 is a collection of sectional diagrams that illustrate the configuration of a zoom lens according to an embodiment of the present disclosure, and FIG. 4 is a diagram that illustrates the trajectories of movement when changing magnification in this zoom lens. The example of the configuration illustrated in FIG. 1 is the same as the configuration of a zoom lens of Example 1 to be described later. In addition, the movement trajectories illustrated in FIG. 4 are common to those of the configurations of zoom lenses of Examples 1 through 3 to be described later. In FIG. 1, the left side is the object side and the right side is the image side. The aperture stop St illustrated in FIG. 1 does not necessarily represent the size or shape thereof, but the position of the aperture stop St along an optical axis Z. In addition, FIG. 1 illustrates an axial light beam wa and a light beam wb at a maximum angle of view.

As illustrated in FIG. 1, this zoom lens is constituted by, in order from the object side to the image side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power.

Figure 2:
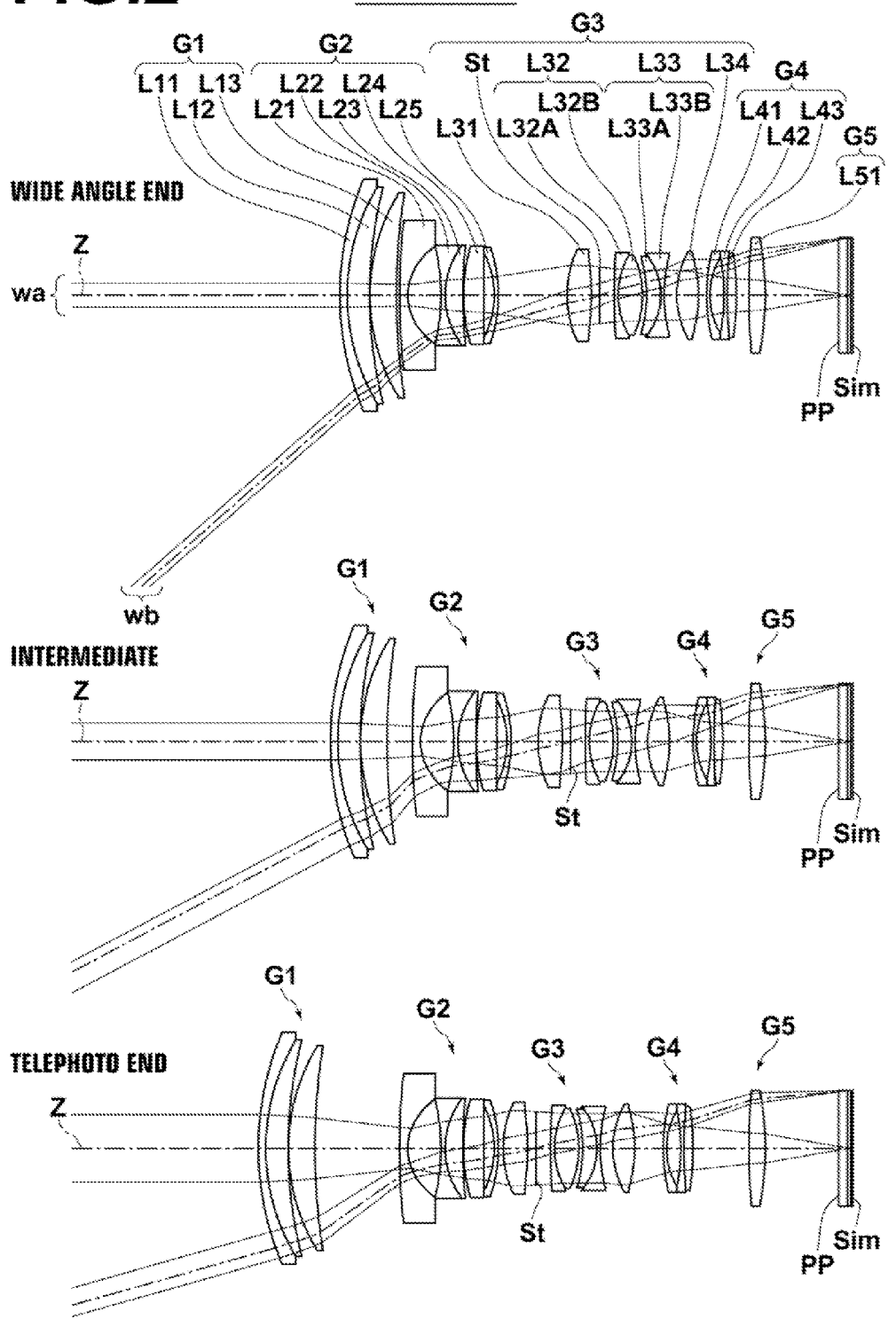
FIG. 2 is a collection of sectional diagrams that illustrate the configuration of a zoom lens according to Example 2.

When this zoom lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 and FIG. 2 illustrate an example in which a plane parallel plate shaped optical member PP that presumes such filters is provided between the lens system and the imaging surface Sim.

This zoom lens is configured such that the distance between the first lens group G1 and the second lens group G2 constantly increases, the distance between the second lens group G2 and the third lens group G3 constantly decreases, the distance between the third lens group G3 and the fourth lens group G4 constantly changes, and the distance between the fourth lens group G4 and the fifth lens group G5 group constantly increases when changing magnification from the wide angle end to the telephoto end. Note that all of the lens groups from the first lens group G1 through the fifth lens group G5 may move, or only a portion of the lens groups may move, when changing magnification. Adopting such a configuration is advantageous from the viewpoint of shortening the total length of the lens system. The advantageous effect of shortening the total length of the lens system becomes particularly prominent in the case that the zoom lens is applied to a non reflex (so called mirrorless) type camera, in which back focus is short.

The first lens group G1 has a positive refractive power, and is constituted by, in order from the object side to the image side, a 1-1 negative lens L11, a 1-2 positive lens L12, and a 1-3 positive lens L13. Configuring the first lens group G1 to have a positive refractive power is advantageous from the viewpoint of shortening the total length of the lens system. In addition, the 1-1 negative lens L11 bears the function of correcting longitudinal chromatic aberration, lateral chromatic aberration, and spherical aberration. In addition, providing the two positive lenses, which are the 1-2 positive lens L12 and the 1-3 positive lens L13, is advantageous from the viewpoints of suppressing the generation of spherical aberration while securing the refractive power of the first lens group G1, shortening the total length of the lens system, and achieving a small F value.

The second lens group G2 has a negative refractive power, and is constituted by, in order form the object side to the image side, a 2-1 negative meniscus lens L21 having a concave surface toward the image side, a 2-2 negative lens L22, a 2-3 positive lens L23, a 2-4 positive lens L24, and a 2-5 negative lens L25. The second lens group G2 principally bears the function of changing magnification. The 2-1 negative meniscus lens L21 suppresses the generation of distortion at the wide angle end, and also secures the principal negative refractive power of the second lens group G2. In addition, by providing a negative lens at the front of the second lens group G2, the angles of off axis principal light rays that enter the lenses thereafter with respect to the optical axis can be decreased, which is advantageous from the viewpoint of widening the angle of view. In addition, the 2-2 negative lens L22 shares the burden of bearing negative refractive power with the 2-1 negative meniscus lens L21, to suppress the generation of various aberrations. The 2-3 positive lens L23 and the 2-4 positive lens L24 suppress fluctuations in longitudinal chromatic aberration, lateral chromatic aberration, and spherical aberration caused by changing magnification. In addition, the heights of off axis principal light rays that pass through the 2-4 positive lens L24 are lower than those that pass through the 2-3 positive lens L23 at the wide angle end. Therefore, lateral chromatic aberration at the wide angle end can be adjusted, by adjusting the dispersion of the two positive lenses. In addition, the generation of spherical aberration can be caused to be unlikely to occur even if the F value is decreased at the telephoto end, by providing two positive lenses. In addition, the 2-5 negative lens L25 shares the burden of bearing negative refractive power with the 2-1 negative meniscus lens L21 and the 2-2 negative lens L22. The heights of off axis principal light rays that pass through the 2-5 negative lens L25 are lower compared to those that pass through the 2-1 negative meniscus lens L21 at the wide angle end, and the heights of marginal axial light rays that pass through the 2-5 negative lens L25 are higher compared to those that pass through the 2-1 negative meniscus lens L21 at the telephoto end. Therefore, balance can be achieved between longitudinal chromatic aberration and lateral chromatic aberration at the wide angle end and at the telephoto end.

The third lens group G3 has a positive refractive power, and bears the principal positive refracting function of the entire lens system.

Fluctuations in astigmatism in an intermediate region caused by changing magnification can be corrected, by the fourth lens group G4 having a negative refractive power.

The fifth lens group G5 has a positive refractive power, and is constituted by a single lens component. The incident angles of light rays at peripheral angles of view with respect to the imaging surface can be decreased, by configuring the fifth lens group G5 to have a positive refractive power. If the number of lenses in the fifth lens group G5 increases and the thickness thereof becomes greater, it will be necessary to increase the refractive powers of the second lens group G2 and the fourth lens group G4 in order to maintain back focus, resulting in an increase in fluctuations of spherical aberration. Such a problem can be resolved by configuring the fifth lens group G5 to be constituted by a single lens component. Note that from this viewpoint, it is preferable for the fifth lens group G5 to be constituted only by a single lens.

In the zoom lens of the present embodiment, it is preferable for Conditional Formula (1) below to be satisfied. The generation of spherical aberration can be suppressed, by configuring the zoom lens such that the value of (L11f−L12r)/(L11f+L12r) is not less than or equal to the lower limit defined in Conditional Formula (1). The generation of astigmatism at the telephoto end can be suppressed, by configuring the zoom lens such that the value of (L11f−L12r)/(L11f+L12r) is not greater than or equal to the upper limit defined in Conditional Formula (1). Note that more favorably properties can be obtained, if Conditional Formula (1-1) below is satisfied.

$$-0.9 < (L11f - L12r)/(L11f + L12r) < -0.1 \quad (1)$$

$$-0.5 < (L11f - L12r)/(L11f + L12r) < -0.12 \quad (1\text{-}1)$$

wherein L11f is the paraxial radius of curvature of the surface of the 1-1 negative lens toward the object side, and L12r is the paraxial radius of curvature of the surface of the 1-2 positive lens toward the image side.

In addition, it is preferable for the third lens group G3 to be constituted by four positive lenses, two negative lenses, and an aperture stop. Spherical aberration can be favorably maintained while the thickness of the third lens group G3 in the direction of the optical axis can be suppressed by providing six lenses in the third lens group G3. Such a configuration is advantageous from the viewpoint of widening the angle of view. In addition, the generation of spherical aberration can be suppressed by distributing positive refractive power among four lenses, particularly at the telephoto end. This configuration is advantageous from the viewpoint of achieving a small F value. The generation of higher order spherical aberration associated with small F values can be suppressed by distributing negative refractive power between two lenses. In addition, the heights of light rays at peripheral angles of view will become low by providing the aperture stop St within the third lens group G3. As a result, imparting the third lens group G3 with a positive refractive power is facilitated.

In addition, it is preferable for the third lens group G3 to be constituted by, in order from the object side to the image side, a 3-1 positive lens L31, the aperture stop, a 3-2 cemented lens L32 having a positive combined refractive power, a 3-3 cemented lens L33 having a negative combined refractive power, and a 3-4 positive lens L34. By the 3-1 positive lens L31 receiving divergent light beams from the second lens group G2, the diameters of the lenses following thereafter can be prevented from becoming great, and the generation of spherical aberration can be suppressed. Such a configuration is advantageous from the viewpoint of achieving a small F value. In addition, obtaining a balance of lateral chromatic aberration is facilitated, by providing lens components having positive refractive powers with the aperture stop St interposed therebetween within the third lens group G3. In addition, various aberrations can be favorably corrected, by adopting a positive negative positive triplet arrangement. In addition, obtaining balance of longitudinal chromatic aberration, lateral chromatic aberration, and spherical aberration is facilitated, by providing two cemented lenses, which are the 3-2 cemented lens L32 and the 3-3 cemented lens L33.

In addition, it is preferable for the 3-2 cemented lens L32 to be formed by cementing a negative lens L32A and a biconvex lens L32B, provided in this order from the object side to the image side, together. The generation of differences in spherical aberration depending on wavelengths will be unlikely to occur, particularly at the telephoto end, by adopting such a configuration.

In addition, it is preferable for the 3-3 cemented lens L33 to be formed by cementing a positive meniscus lens L33A having a convex surface toward the image side and a biconcave lens L33B, provided in this order from the object side to the image side, together. The 3-3 cemented lens L33 is farther from the aperture stop St than the 3-2 cemented lens L32, and there are differences in the heights of off axis principal light rays at the wide angle end and at the telephoto end. Therefore, obtaining a balance of lateral chromatic aberration is facilitated.

In addition, the generation of spherical aberration within the third lens group G3 can be suppressed, by forming at least one surface of the 3-1 positive lens L31 to be an aspherical surface.

In addition, the generation of astigmatism and spherical aberration within the third lens group G3 can be suppressed, by forming at least one surface of the 3-4 positive lens L34 to be an aspherical surface.

In addition, it is preferable for Conditional Formula (2) below to be satisfied. The generation of differences in spherical aberration depending on wavelengths can be suppressed, particularly at the telephoto end while distributing negative refractive power between the 2-1 negative lens L21 and the 2-2 negative lens L22, by configuring the zoom lens such that the value of f2/L22 is not less than or equal to the lower limit defined in Conditional Formula (2). In addition, the generation of negative distortion at the wide angle end can be suppressed, by configuring the zoom lens such that the value of f2/L22 is not greater than or equal to the upper limit defined in Conditional Formula (2). Note that more favorable properties can be obtained if Conditional Formula (2-1) below is satisfied.

$$0.15 < f2/L22f < 1 \quad (2)$$

$$0.2 < f2/L22f < 0.7 \quad (2\text{-}1)$$

wherein f2 is the paraxial focal length of the second lens group with respect to the d line, and L22f is the paraxial radius of curvature of the surface of the 2-2 negative lens toward the object side.

In addition, it is preferable for Conditional Formula (3) below to be satisfied. Configuring the zoom lens such that the value of f2/f21 is not less than or equal to the lower limit defined in Conditional Formula (3) is advantageous from the viewpoint of widening the angle of view. Fluctuations in spherical aberrations caused by changing magnification can be suppressed, by configuring the zoom lens such that the value of f2/f21 is not greater than or equal to the upper limit defined in Conditional Formula (3). Note that more favorable properties can be obtained if Conditional Formula (3-1) below is satisfied.

$$0.6 < f2/f21 < 1.3 \quad (3)$$

$$0.7 < f2/f21 < 1.1 \quad (3\text{-}1)$$

wherein f2 is the paraxial focal length of the second lens group with respect to the d line, and f21 is the paraxial focal length of the 2-1 negative lens with respect to the d line.

In addition, it is preferable for Conditional Formula (4) below to be satisfied. The rearward principal point of the third lens group G3 can moved toward the image side, by configuring the zoom lens such that the value of f3/f34 is not less than or equal to the lower limit defined in Conditional Formula (4). As a result, securing back focus is facilitated. In addition, the generation of spherical aberration can be suppressed, by configuring the zoom lens such that the value of f3/f34 is not greater than or equal to the upper limit defined in Conditional Formula (4). Note that more favorable properties can be obtained if Conditional Formula (4-1) below is satisfied.

$$0.7 < f3/f34 < 1.6 \qquad (4)$$

$$0.9 < f3/f34 < 1.5 \qquad (4\text{-}1)$$

wherein f3 is the paraxial focal length of the third lens group with respect to the d line, and f34 is the paraxial focal length of the 3-4 positive lens with respect to the d line.

In addition, it is preferable for Conditional Formula (5) below to be satisfied. Obtaining a balance of lateral chromatic aberration is facilitated, by configuring the zoom lens such that the value of f3/f31 is not less than or equal to the lower limit defined in Conditional Formula (5). In addition, the generation of spherical aberration can be suppressed, by configuring the zoom lens such that the value of f3/f31 is not greater than or equal to the upper limit defined in Conditional Formula (5). In addition, the rearward principal point of the third lens group G3 can be prevented from being excessively toward the object side. As a result, maintaining back focus is facilitated. Note that more favorable properties can be obtained if Conditional Formula (5-1) below is satisfied.

$$0.2 < f3/f31 < 1.5 \qquad (5)$$

$$0.3 < f3/f31 < 1.2 \qquad (5\text{-}1)$$

wherein f3 is the paraxial focal length of the third lens group with respect to the d line, and f31 is the paraxial focal length of the 3-1 positive lens with respect to the d line.

In addition, it is preferable for the fifth lens group G5 to be fixed with respect to the imaging surface Sim when changing magnification. The lenses and a lens barrel can be sealed by adopting this configuration, and the entry of foreign can be prevented thereby. Foreign matter is likely to be pictured particularly in non reflex type cameras. Therefore, such a configuration is effective in preventing foreign matter from being pictured in the case that the zoom lens is applied to such cameras.

In addition, it is preferable for the fifth lens group G5 to be constituted by a single lens, and for Conditional Formula (6) below to be satisfied. Securing of back focus is facilitated by configuring the fifth lens group G5 such that it consists of a single lens. In addition, fluctuations in lateral chromatic aberration between the wide angle end and the telephoto end can be suppressed, by Conditional Formula (6) being satisfied. Note that more favorable properties can be obtained if Conditional Formula (6-1) below is satisfied.

$$15 < vd5 < 40 \qquad (6)$$

$$16 < vd5 < 38 \qquad (6\text{-}1)$$

wherein vd5 is the Abbe's number of the single lens with respect to the d line.

In addition, it is preferable for camera shake prevention to be performed by moving the 3-3 cemented lens L33 of the third lens group G3 in a direction perpendicular to the optical axis. The 3-3 cemented lens L33 is comparatively close to the aperture stop St, and therefore the heights of off axis light beams are low, and it is easy to suppress fluctuations in astigmatism due to shake preventing operations. In addition, imparting a strong negative refractive power to the 3-3 cemented lens L33 is facilitated by the being interposed between the 3-2 cemented lens L32 having a positive refractive power and the 3-4 positive lens L34. Such a configuration is advantageous from the viewpoint of decreasing the amount of movement during shake preventing operations.

In addition, it is preferable for Conditional Formula (7) below to be satisfied. Fluctuations in lateral chromatic aberration at the wide angle end and at the telephoto end can be suppressed by Conditional Formula (7) being satisfied. Note that more favorable properties can be obtained if Conditional Formula (7-1) below is satisfied.

$$20 < vd31 < 40 \qquad (7)$$

$$25 < vd31 < 35 \qquad (7\text{-}1)$$

wherein vd31 is the Abbe's number of the 3-1 positive lens with respect to the d line.

In addition, it is preferable for focusing operations to be performed by moving only the fourth lens group G4. The lens diameters of the lenses of the first lens group G1 are great. Therefore the first lens group G1 is heavy and not suited as a focusing lens group. In addition, if the second lens group G2 is employed as a focusing lens group, fluctuations in the angle of view will be generated, which is not preferable. In addition, if the third lens group G3 is employed as a focusing lens group, production sensitivity will become excessively high, which is not preferable. Accordingly, it is preferable for the fourth lens group G4 to be employed as the focusing lens group.

Note that the fourth lens group the fourth lens group G4 may be constituted by, in order from the object side to the image side, a 4-1 negative lens which has a surface toward the image side with a radius of curvature having a lower absolute value than that of the surface toward the object side, a 4-2 negative lens, which has a concave surface toward the image side, and a 4-3 positive lens, and the fourth lens group G4 may be configured to move toward the image side when changing focus from an object at a far distance to an object at a close distance. By providing two negative lenses at the object side, the forward principal point of the fourth lens group G4 can be moved toward the object side. Therefore, focusing sensitivity can be increased without increasing the negative refractive power of the fourth lens group G4 as a whole, and the amount of movement of the fourth lens group G4 during focusing operations can be suppressed. In addition, negative refractive power can be distributed by providing two negative lenses. As a result, fluctuations in spherical aberration and astigmatism during focusing operations can be suppressed. In addition, fluctuations in spherical aberration and astigmatism during focusing operations can be further suppressed by the 4-1 negative lens and the 4-2 negative lens having the configurations described above. This aspect of the present disclosure corresponds to Examples 1 and 2 to be described later.

Alternatively, the fourth lens group the fourth lens group G4 may be constituted by, in order from the object side to the image side, a 4-1 positive lens which has a surface toward the image side with a radius of curvature having a lower absolute value than that of the surface toward the object side, a biconcave 4-2 negative lens, and a 4-3 positive lens which has a surface toward the object side with a radius of curvature having a lower absolute value than that of the surface toward the image side, and the fourth lens group G4 may be configured to move toward the image side when changing focus from an object at a far distance to an object at a close distance. By providing the 4-1 positive lens and the 4-3 positive lens to distribute positive refractive power at the front and the rear of the fourth lens group G4 in this manner, fluctuations in longitudinal chromatic aberration and lateral chromatic aberration during focusing operations can be suppressed. Note that longitudinal chromatic aberration is principally corrected by the forward 4-1 positive lens, in which the heights of marginal axial light rays are high, while lateral chromatic aberration is principally corrected by the rearward 4-3 positive lens, in which the heights of off axis principal light rays are high. This aspect of the present disclosure corresponds to Example 3 to be described later.

In the case that the present zoom lens is to be utilized in an environment in which the zoom lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the zoom lens of the present disclosure will be described.

First, the zoom lens of Example 1 will be described. FIG. 1 is a collection of sectional diagrams that illustrate the lens configuration of the zoom lens of Example 1. Note that in FIG. 1 and FIGS. 2 and 3 that correspond to Examples 2 and 3 to be described later, the left side is the object side, the right side is the image side, and the aperture stops St in the drawings do not necessarily represent the size or the shape thereof, but the position thereof along the optical axis Z. Note that the aperture stops St of Examples 1 through 3 are variable stops.

Basic lens data are shown in Table 1, data related to various items are shown in Table 2, data related to the distances among movable surfaces are shown in Table 3, and aspherical surface coefficients are shown in Table 4, for the zoom lens of Example 1. In the following description, the meanings of the symbols in the tables will be described for Example 1. The meanings of the symbols are basically the same for Examples 2 and 3.

In the lens data of Table 1, surface numbers that sequentially increase from the object side to the image side, with the surface of the constituent element at the most object side designated as first, are shown in the column "Surface Number". The radii of curvature of ith surfaces are shown in the column of "Radius of Curvature", the distances along the optical axis Z between each surface and a next surface are shown in the column "Distance". The refractive indices of each optical element with respect to the d line (wavelength: 587.6 nm) are shown in the column nd. The Abbe's numbers of each optical element with respect to the d line (wavelength: 587.6 nm) are shown in the column vd.

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop. In addition, DD [surface number] is indicated in the column "Distance" for distances that change while changing magnification. The numerical values corresponding to DD [surface number] are shown in Table 3.

Table 2 shows the values of the zoom magnification rates of the entire system, the focal lengths "f", the back focus "Br", F values "F No.", the angles of view "2ω", at the wide angle end, at an intermediate position, and at the telephoto end, respectively, as the data related to various items.

In the basic lens data, the data related to various items, and the data related to the movable surfaces, mm are used as the units for lengths and degrees are used as the units for angles. However, it is possible for optical systems to be proportionately enlarged or proportionately reduced and utilized. Therefore, other appropriate units may be used.

In the lens data of Table 1, the symbol "*" is appended to the surface numbers of aspherical surfaces, and numerical values that represent the paraxial radii of curvature are shown as the radii of curvature of the aspherical surfaces. The data of Table 4 related to aspherical surface coefficients show the surface numbers of the aspherical surfaces and aspherical surface coefficients related to the aspherical surfaces. The aspherical coefficients are the values of coefficients KA and Am (m=3~16) in the aspherical surface formula below.

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line from a point on the aspherical surface at a height h to a plane perpendicular to the optical axis in contact with the peak of the aspherical surface), h is height (the distance from the optical axis), C is the inverse of the paraxial radius of curvature, and KA and Am (m=3~16) are aspherical surface coefficients.

TABLE 1

Example 1: Lens Data

| Surface Number | Radius of Curvature | Distance | nd | vd |
|---|---|---|---|---|
| 1 | 69.44253 | 1.810 | 1.92286 | 18.90 |
| 2 | 51.04850 | 5.500 | 1.75500 | 52.32 |
| 3 | 96.08722 | 0.100 | | |
| 4 | 51.06771 | 6.281 | 1.75500 | 52.32 |
| 5 | 159.70587 | DD [5] | | |
| *6 | 274.86998 | 2.000 | 1.85135 | 40.10 |
| *7 | 13.50517 | 8.250 | | |
| 8 | −44.35909 | 1.010 | 1.75500 | 52.32 |
| 9 | 21.39517 | 4.243 | 1.92286 | 18.90 |
| 10 | 114.73962 | 0.100 | | |
| 11 | 42.34513 | 4.500 | 1.61340 | 44.27 |
| 12 | −39.60921 | 1.280 | | |
| 13 | −23.13255 | 1.000 | 1.83481 | 42.72 |
| 14 | −56.31648 | DD [14] | | |
| *15 | 27.59432 | 5.480 | 1.68893 | 31.16 |
| *16 | −46.86702 | 2.000 | | |
| 17 (stop) | ∞ | 3.600 | | |
| 18 | −4504.29358 | 1.010 | 1.92286 | 18.90 |
| 19 | 21.60058 | 6.061 | 1.49700 | 81.54 |
| 20 | −22.93351 | 1.000 | | |
| 21 | −32.68892 | 3.510 | 1.80610 | 33.27 |
| 22 | −15.99815 | 0.800 | 1.61340 | 44.27 |
| 23 | 41.96404 | 2.750 | | |
| *24 | 20.89777 | 5.401 | 1.63246 | 63.77 |
| *25 | −33.31372 | DD [25] | | |
| 26 | 203.33391 | 0.800 | 1.69680 | 55.53 |
| 27 | 21.29209 | 2.492 | | |
| 28 | −308.14973 | 0.810 | 1.80000 | 29.84 |
| 29 | 66.23081 | 2.200 | 1.49700 | 81.54 |
| 30 | −143.07733 | DD [30] | | |

TABLE 1-continued

Example 1: Lens Data

| Surface Number | Radius of Curvature | Distance | nd | νd |
|---|---|---|---|---|
| 31 | 283.28159 | 3.000 | 1.95906 | 17.47 |
| 32 | −77.29283 | 19.353 | | |
| 33 | ∞ | 0.350 | 1.54763 | 54.98 |
| 34 | ∞ | 0.700 | 1.49784 | 54.98 |
| 35 | ∞ | 0.517 | | |

TABLE 2

Example 1: Items (d line)

| | Wide Angle End | Intermediate | Telephoto End |
|---|---|---|---|
| Zoom Ratio | 1.0 | 1.6 | 3.2 |
| f | 16.508 | 26.851 | 53.489 |
| Bf | 20.564 | 20.564 | 20.564 |
| F No. | 2.88 | 2.88 | 2.88 |
| 2ω (°) | 87.8 | 56.0 | 29.0 |

TABLE 3

Example 1: Zoom Distances

| | Wide Angle End | Intermediate | Telephoto End |
|---|---|---|---|
| DD [5] | 0.800 | 8.022 | 24.731 |
| DD [14] | 19.778 | 7.290 | 0.707 |
| DD [25] | 2.000 | 5.926 | 7.152 |
| DD [30] | 3.962 | 7.143 | 16.541 |

TABLE 4

Example 1: Aspherical Surface Coefficients

| Surface Number | 6 | 7 | 15 |
|---|---|---|---|
| KA | 1.0000000E+00 | 6.8200625E−02 | 1.0000000E+00 |
| A3 | 0.0000000E+00 | 0.0000000E+00 | 0.0000000E+00 |
| A4 | −1.6542763E−05 | −2.1770307E−05 | 4.0916298E−06 |
| A5 | 3.1580754E−06 | 2.0043438E−05 | −6.9760935E−06 |
| A6 | −1.0841097E−07 | −4.4632949E−06 | 1.1908851E−06 |
| A7 | −7.0550768E−09 | 5.5083629E−07 | −6.1917345E−08 |
| A8 | 2.3397196E−10 | −1.9406600E−08 | −1.4260597E−09 |
| A9 | 1.4614498E−11 | −1.9396074E−09 | 1.7101476E−10 |
| A10 | 3.7464350E−13 | 8.0745754E−11 | −9.4409745E−12 |
| A11 | −1.5085872E−14 | 1.0933062E−11 | 2.4503446E−12 |
| A12 | −2.4538433E−15 | 1.0514807E−13 | −1.0307497E−13 |
| A13 | −8.8199888E−17 | −7.5718025E−14 | |
| A14 | 3.7889786E−18 | −2.6708549E−15 | |
| A15 | 5.6209193E−19 | 5.7230640E−16 | |
| A16 | −1.9328980E−20 | −1.6695622E−17 | |

| Surface Number | 16 | 24 | 25 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 2.3974903E−05 | −2.6668083E−05 | 2.2688209E−05 |
| A5 | −5.1303813E−06 | 4.4853580E−07 | −5.8731599E−06 |
| A6 | 8.6656166E−07 | −1.8442559E−07 | 9.5151875E−07 |
| A7 | −2.3970256E−08 | 3.3004366E−08 | −2.1896649E−08 |
| A8 | −4.1181719E−09 | −1.1887222E−09 | −5.5312058E−09 |
| A9 | 1.4125246E−10 | −2.3680588E−10 | −2.1496710E−10 |
| A10 | 2.2550236E−11 | −5.9327223E−13 | 4.5232924E−11 |
| A11 | −4.4304671E−13 | 3.1048661E−12 | 3.0325523E−12 |
| A12 | −8.9132478E−15 | 1.2826795E−13 | 8.4353665E−14 |
| A13 | | −6.6033389E−15 | 3.4395677E−15 |
| A14 | | −3.3045541E−15 | −3.8506298E−15 |
| A15 | | −4.1085542E−17 | −4.8917476E−16 |
| A16 | | 2.1330614E−17 | 5.3939655E−17 |

FIG. 5 is a collection of diagrams that illustrate various aberrations of the zoom lens of Example 1. The spherical aberration, the astigmatism, the distortion, and the lateral chromatic aberration of the zoom lens of Example 1 at the wide angle end are illustrated in this order from the left side of the drawing sheet at the upper portion of FIG. 5. The spherical aberration, the astigmatism, the distortion, and the lateral chromatic aberration of the zoom lens of Example 1 at an intermediate focal distance are illustrated are illustrated in this order from the left side of the drawing sheet at the middle portion of FIG. 5. The spherical aberration, the astigmatism, the distortion, and the lateral chromatic aberration of the zoom lens of Example 1 at the telephoto end are illustrated in are illustrated in this order from the left side of the drawing sheet at the lower portion of FIG. 5. The diagrams that illustrate spherical aberration, astigmatism, and distortion show aberrations using the d line (wavelength: 587.6 nm) as a reference wavelength. The diagrams that illustrate spherical aberration show aberrations related to the d line (wavelength: 587.6 nm), aberrations related to the C line (wavelength: 656.3 nm), aberrations related to the F line (wavelength: 486.1 nm), and aberrations related to the g line (wavelength: 435.8 nm) as solid lines, long broken lines, short broken lines, and solid gray lines, respectively. In the diagrams that illustrate astigmatism, aberrations in the sagittal direction and aberrations in the tangential direction are indicated by solid lines and short broken lines, respectively. In the diagrams that illustrate lateral chromatic aberration, aberrations related to the C line (wavelength: 656.3 nm), aberrations related to the F line (wavelength: 486.1 nm), and aberrations related to the g line (wavelength: 435.8 nm) are shown as long broken lines, short broken lines, and solid gray lines, respectively. Note that these vertical aberrations are all for a state focused on an object at infinity. In the diagrams that illustrate spherical aberrations, "FNo." denotes F values. In the other diagrams that illustrate the aberrations, "ω" denotes half angles of view.

The symbols, the meanings, and the manner in which the data are shown in the description of Example 1 above are the same for the following Examples to be described later, unless particularly noted. Therefore, redundant descriptions thereof will be omitted below.

Next, a zoom lens according to Example 2 will be described. FIG. 2 is a collection of sectional diagrams that illustrate the lens configuration of the zoom lens of Example 2. Basic lens data are shown in Table 5, data related to various items are shown in Table 6, data related to the distances among movable surfaces are shown in Table 7, data related to aspherical surface coefficients are shown in Table 8, and various aberrations are illustrated in FIG. 6 for the zoom lens of Example 2.

TABLE 5

Example 2: Lens Data

| Surface Number | Radius of Curvature | Distance | nd | vd |
|---|---|---|---|---|
| 1 | 74.77155 | 1.810 | 1.92286 | 18.90 |
| 2 | 53.10639 | 5.500 | 1.75500 | 52.32 |
| 3 | 110.48687 | 0.100 | | |
| 4 | 49.47665 | 6.500 | 1.75500 | 52.32 |
| 5 | 166.22242 | DD [5] | | |
| *6 | 182.33261 | 2.000 | 1.85135 | 40.10 |
| *7 | 13.34430 | 8.250 | | |
| 8 | −50.15599 | 1.010 | 1.75500 | 52.32 |
| 9 | 20.71980 | 4.429 | 1.92286 | 18.90 |
| 10 | 148.70042 | 0.100 | | |
| 11 | 45.09775 | 5.061 | 1.74100 | 52.64 |
| 12 | −682.75037 | 2.500 | | |
| 13 | −23.22731 | 1.000 | 1.83481 | 42.72 |
| 14 | −37.28721 | DD [14] | | |
| *15 | 27.63063 | 6.000 | 1.68893 | 31.16 |
| *16 | −53.66847 | 2.000 | | |
| 17 (stop) | ∞ | 3.600 | | |
| 18 | 161.71665 | 1.010 | 1.92286 | 18.90 |
| 19 | 20.47699 | 5.962 | 1.49700 | 81.54 |
| 20 | −23.87360 | 1.000 | | |
| 21 | −34.00409 | 3.510 | 1.80610 | 33.27 |
| 22 | −16.25557 | 0.800 | 1.61340 | 44.27 |
| 23 | 39.33211 | 3.110 | | |
| *24 | 20.90754 | 5.360 | 1.59271 | 66.97 |
| *25 | −33.47861 | DD [25] | | |
| 26 | 47.26119 | 0.800 | 1.65160 | 58.55 |
| 27 | 18.85026 | 3.500 | | |
| 28 | −48.54750 | 0.810 | 1.80000 | 29.84 |
| 29 | 143.34524 | 2.200 | 1.49700 | 81.54 |
| 30 | −71.64293 | DD [30] | | |
| 31 | 174.02299 | 4.000 | 1.95906 | 17.47 |
| 32 | −78.09992 | 18.152 | | |
| 33 | ∞ | 2.150 | 1.54763 | 54.98 |
| 34 | ∞ | 0.700 | 1.49784 | 54.98 |
| 35 | ∞ | 0.519 | | |

TABLE 6

Example 2: Items (d line)

| | Wide Angle End | Intermediate | Telephoto End |
|---|---|---|---|
| Zoom Ratio | 1.0 | 1.5 | 2.8 |
| f | 17.500 | 26.683 | 48.481 |
| Bf | 20.528 | 20.517 | 20.498 |
| F No. | 2.88 | 2.88 | 2.88 |
| 2ω (°) | 83.6 | 56.4 | 31.8 |

TABLE 7

Example 2: Zoom Distances

| | Wide Angle End | Intermediate | Telephoto End |
|---|---|---|---|
| DD [5] | 0.800 | 6.235 | 20.825 |
| DD [14] | 16.915 | 6.665 | 1.222 |
| DD [25] | 2.000 | 5.818 | 7.046 |
| DD [30] | 3.083 | 6.403 | 13.777 |

TABLE 8

Example 2: Aspherical Surface Coefficients

| Surface Number | 6 | 7 | 15 |
|---|---|---|---|
| KA | 1.0000000E+00 | −1.2914394E−01 | 1.0000000E+00 |
| A3 | 0.0000000E+00 | 0.0000000E+00 | 0.0000000E+00 |
| A4 | −1.9620653E−05 | −9.6545431E−06 | 5.4986393E−06 |
| A5 | 3.1383293E−06 | 2.0065424E−05 | −6.4084522E−06 |
| A6 | −1.0219252E−07 | −4.5289255E−06 | 1.1664430E−06 |
| A7 | −6.8961155E−09 | 5.5236802E−07 | −6.8862620E−08 |
| A8 | 2.2948859E−10 | −1.7493159E−08 | −1.6194088E−09 |
| A9 | 1.4121463E−11 | −2.1891943E−09 | 3.0402613E−10 |
| A10 | 3.5275757E−13 | 8.8333348E−11 | −1.0010587E−11 |
| A11 | −1.5356971E−14 | 1.1349856E−11 | 1.7524490E−12 |
| A12 | −2.4312443E−15 | 9.4448552E−14 | −1.0300850E−13 |
| A13 | −8.5106875E−17 | −7.6839418E−14 | |
| A14 | 3.9703906E−18 | −2.6433171E−15 | |
| A15 | 5.6263898E−19 | 5.6967697E−16 | |
| A16 | −1.9930005E−20 | −1.6468255E−17 | |

| Surface Number | 16 | 24 | 25 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 2.5821628E−05 | −2.3576847E−05 | 2.1859445E−05 |
| A5 | −4.5939788E−06 | −1.7131604E−07 | −5.8470454E−06 |
| A6 | 8.0766362E−07 | −1.6285813E−07 | 8.9178132E−07 |

TABLE 8-continued

| Example 2: Aspherical Surface Coefficients | | | |
|---|---|---|---|
| A7 | −2.4623593E−08 | 3.6801875E−08 | −1.7829465E−08 |
| A8 | −4.8634390E−09 | −7.8661933E−10 | −5.2497097E−09 |
| A9 | 3.2260967E−10 | −3.4203485E−10 | −1.5296509E−10 |
| A10 | 1.7828829E−11 | 8.9192949E−14 | 3.8162220E−11 |
| A11 | −7.8385800E−13 | 3.3285050E−12 | 2.4547345E−12 |
| A12 | −2.9050457E−14 | 1.3292463E−13 | 6.0048694E−14 |
| A13 | | −5.1657412E−15 | 4.9353444E−15 |
| A14 | | −3.2096116E−15 | −3.1199947E−15 |
| A15 | | −5.1830079E−17 | −4.2902031E−16 |
| A16 | | 2.0460142E−17 | 4.5865461E−17 |

Figure 3:
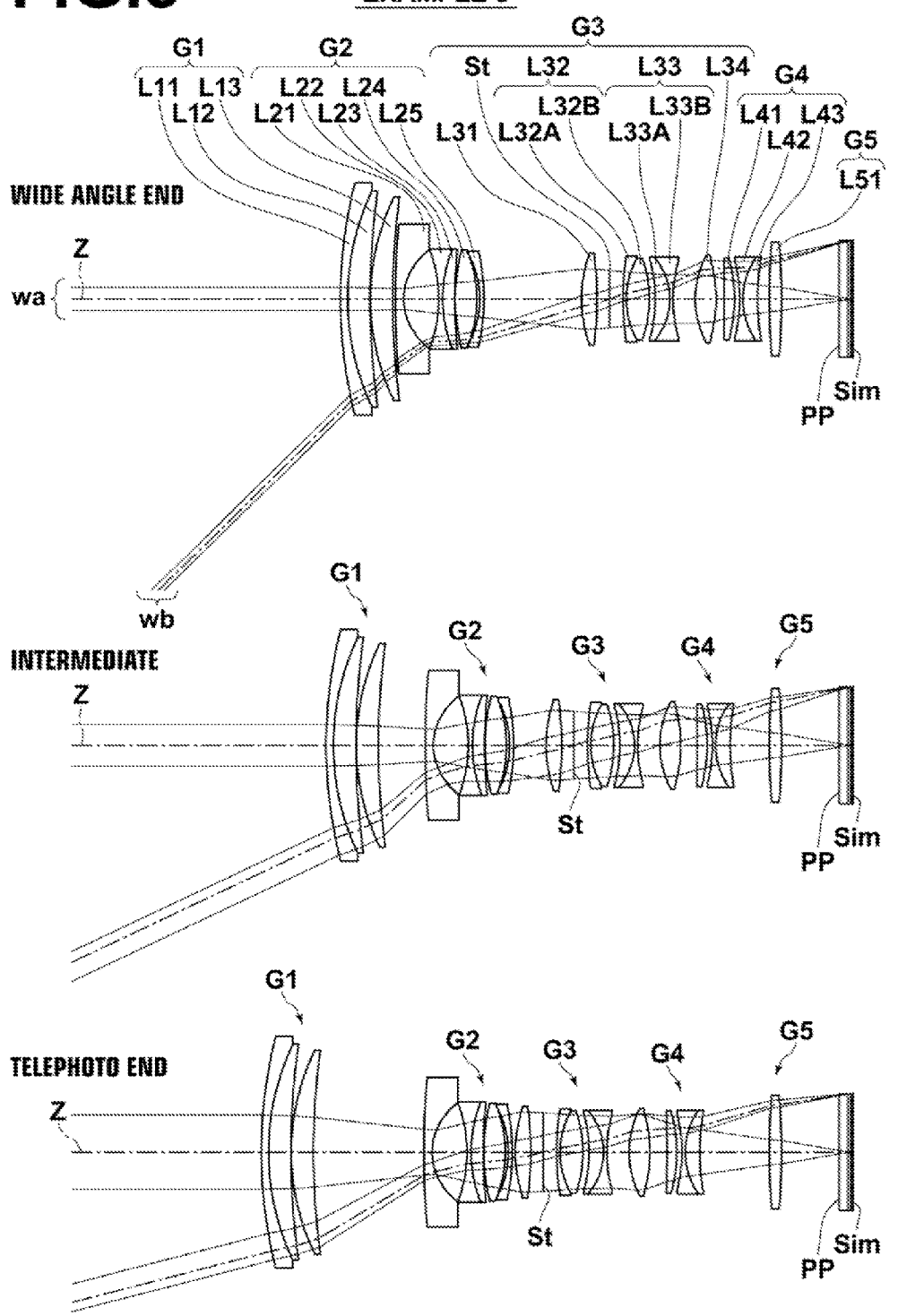
FIG. 3 is a collection of sectional diagrams that illustrate the configuration of a zoom lens according to Example 3.

Next, a zoom lens according to Example 3 will be described. FIG. 3 is a collection of sectional diagrams that illustrate the lens configuration of the zoom lens of Example 3. Basic lens data are shown in Table 9, data related to various items are shown in Table 10, data related to the distances among movable surfaces are shown in Table 11, data related to aspherical surface coefficients are shown in Table 12, and various aberrations are illustrated in FIG. 7 for the zoom lens of Example 3.

TABLE 9

| Example 3: Lens Data | | | | |
|---|---|---|---|---|
| Surface Number | Radius of Curvature | Distance | nd | νd |
| 1 | 119.99678 | 1.790 | 1.92286 | 18.90 |
| 2 | 63.93730 | 5.522 | 1.75500 | 52.32 |
| 3 | 195.05992 | 0.100 | | |
| 4 | 59.07860 | 5.463 | 1.88300 | 40.76 |
| 5 | 192.79122 | DD [5] | | |
| *6 | 627.02735 | 2.000 | 1.85135 | 40.10 |
| *7 | 14.59519 | 8.676 | | |
| 8 | −34.35895 | 1.010 | 1.83481 | 42.72 |
| 9 | 34.35895 | 3.000 | 2.00069 | 25.46 |
| 10 | 125.80011 | 0.100 | | |
| 11 | 49.82939 | 5.309 | 1.80000 | 29.84 |
| 12 | −31.71549 | 0.740 | | |
| 13 | −23.97541 | 1.000 | 1.72916 | 54.68 |
| 14 | −55.46402 | DD [14] | | |
| *15 | 31.23616 | 3.860 | 1.68893 | 31.16 |
| 16 | −86.11797 | 3.019 | | |
| 17 (stop) | ∞ | 3.350 | | |
| 18 | 70.00056 | 0.850 | 1.92286 | 18.90 |
| 19 | 21.26715 | 5.639 | 1.49700 | 81.54 |
| 20 | −31.67454 | 1.500 | | |
| 21 | −36.77591 | 3.587 | 1.80100 | 34.97 |
| 22 | −16.15989 | 0.800 | 1.61340 | 44.27 |
| 23 | 36.11698 | 5.478 | | |
| *24 | 22.66252 | 5.181 | 1.61881 | 63.85 |
| *25 | −31.77612 | DD [25] | | |
| 26 | −838.32170 | 2.459 | 1.51680 | 64.20 |
| 27 | −39.01268 | 1.267 | | |
| 28 | −39.83267 | 0.820 | 1.80610 | 40.93 |
| 29 | 18.51849 | 3.597 | 1.48749 | 70.24 |
| 30 | 59.99935 | DD [30] | | |
| 31 | 180.44878 | 3.000 | 1.92286 | 18.90 |
| 32 | −180.44878 | 14.264 | | |
| 33 | ∞ | 2.150 | 1.54763 | 54.98 |
| 34 | ∞ | 0.700 | 1.49784 | 54.98 |
| 35 | ∞ | 0.511 | | |

TABLE 10

| Example 3: Items (d line) | | | |
|---|---|---|---|
| | Wide Angle End | Intermediate | Telephoto End |
| Zoom Ratio | 1.0 | 1.8 | 3.2 |
| f | 16.550 | 29.790 | 53.622 |
| Bf | 16.631 | 16.631 | 16.631 |
| F No. | 2.88 | 2.88 | 2.88 |
| 2ω (°) | 89.8 | 51.2 | 29.2 |

TABLE 11

| Example 3: Zoom Distances | | | |
|---|---|---|---|
| | Wide Angle End | Intermediate | Telephoto End |
| DD [5] | 0.725 | 11.561 | 27.258 |
| DD [14] | 24.065 | 7.993 | 0.697 |
| DD [25] | 2.000 | 4.024 | 4.126 |
| DD [30] | 2.922 | 9.636 | 17.149 |

TABLE 12

| Example 3: Aspherical Surface Coefficients | | | |
|---|---|---|---|
| Surface Number | 6 | 7 | 15 |
| KA | 1.0000000E+00 | 1.0000000E+00 | 1.0000000E+00 |
| A3 | 0.0000000E+00 | 0.0000000E+00 | 0.0000000E+00 |
| A4 | 5.6779510E−05 | −2.5443972E−05 | −1.6505926E−05 |
| A5 | −9.9107714E−06 | 2.7910134E−05 | 7.1247472E−07 |
| A6 | 6.3151724E−07 | −7.2391669E−06 | 4.0120941E−08 |
| A7 | −1.4471388E−09 | 6.1206010E−07 | −3.3241340E−08 |
| A8 | −8.7684282E−10 | 6.4592790E−09 | 2.2077363E−09 |
| A9 | −2.7965362E−11 | −2.4211790E−09 | 1.8842384E−10 |
| A10 | 8.3874377E−13 | −8.1351334E−11 | −1.4744024E−11 |
| A11 | 1.0734344E−13 | 5.9294218E−12 | −1.0398613E−12 |
| A12 | 3.5568984E−15 | 9.1792699E−13 | 7.5863243E−14 |
| A13 | −8.0078506E−17 | −1.2832639E−14 | |

TABLE 12-continued

Example 3: Aspherical Surface Coefficients

| | | |
|---|---|---|
| A14 | −1.4383030E−17 | −4.0610296E−15 |
| A15 | −5.1422247E−19 | 3.8790012E−17 |
| A16 | 3.6116557E−20 | 5.4875418E−18 |

| Surface Number | 24 | 25 |
|---|---|---|
| KA | 1.0000000E+00 | 1.0000000E+00 |
| A3 | 0.0000000E+00 | 0.0000000E+00 |
| A4 | −2.8019103E−05 | 1.3320477E−05 |
| A5 | 4.9221596E−06 | 1.7626660E−06 |
| A6 | −5.6627353E−07 | −2.1724548E−07 |
| A7 | −1.5893688E−08 | −1.2582268E−08 |
| A8 | 3.1562998E−09 | 1.5072585E−09 |
| A9 | 3.8501889E−10 | 2.4146909E−10 |
| A10 | 1.1014506E−11 | 2.7296944E−12 |
| A11 | −2.5862728E−12 | −1.2224101E−12 |
| A12 | −4.1562149E−13 | −1.6506220E−13 |
| A13 | −3.1260025E−14 | −4.4411006E−15 |
| A14 | 2.3816854E−15 | 9.6920388E−16 |
| A15 | 8.0657653E−16 | −3.4090174E−17 |
| A16 | −4.6505118E−17 | 9.7373429E−18 |

Table 13 shows values corresponding to Conditional Formulae (1) through (7) for the zoom lenses of Examples 1 through 3. Note that all of the Examples use the d line as a reference wavelength, and the values shown in Table 13 are those with respect to the reference wavelength.

TABLE 13

| Formula | Condition | Example 1 | Example 2 | Example 3 |
|---|---|---|---|---|
| (1) | (L11f − L12r)/(L11f + L12r) | −0.161 | −0.193 | −0.238 |
| (2) | f2/L22f | 0.309 | 0.268 | 0.514 |
| (3) | f2/f21 | 0.820 | 0.789 | 1.005 |
| (4) | f3/f34 | 1.143 | 1.098 | 1.199 |
| (5) | f3/f31 | 0.928 | 0.906 | 0.460 |
| (6) | vd5 | 17.47 | 17.47 | 18.90 |
| (7) | vd31 | 31.16 | 31.16 | 31.16 |

Based on the data above, it can be understood that all of the zoom lenses of Examples 1 through 3 satisfy Conditional Formulae (1) through (7), and that these zoom lenses have wide full angles of view at the wide angle end of at least 83.6° and small F values of 3.0 or less and further 2.9 or less throughout the entire zoom range, and favorably correct various aberrations. Note that all of the zoom lenses of Examples 1 through 3 are standard zoom lenses that have zoom ranges that include a focal length of 50 mm as a 135 film converted value. However, the values of the focal lengths f' shown as items of the Examples are not 135 film converted focal lengths themselves. The values of the focal lengths as 135 film converted focal lengths are approximately 1.5 times the values of the focal lengths f'.

Figure 8:
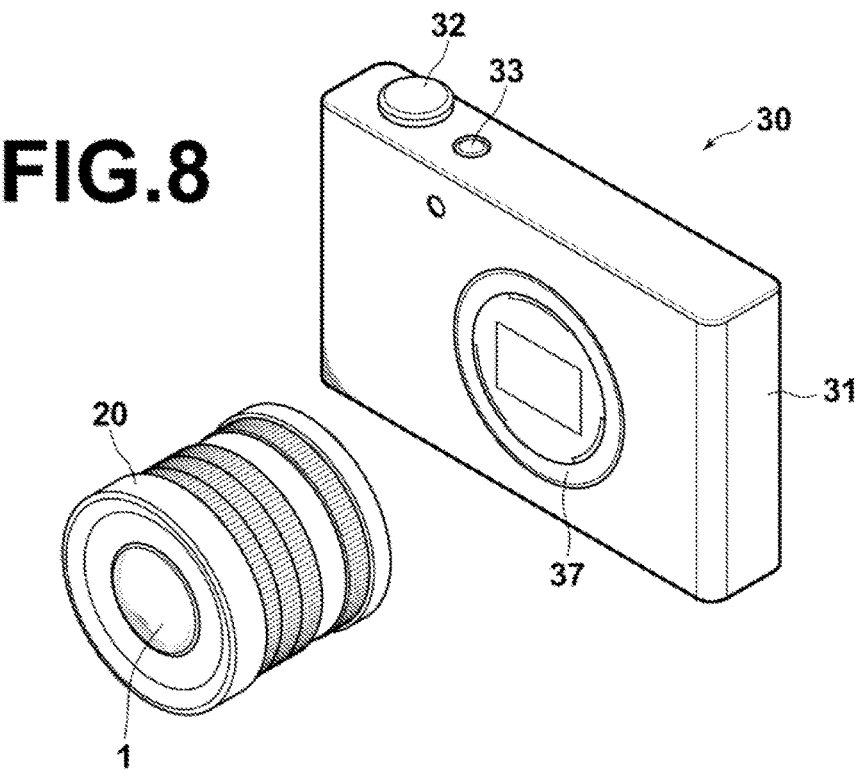
FIG. 8 is a perspective view that illustrates the front side of an imaging apparatus as an embodiment of the present disclosure.
Figure 9:
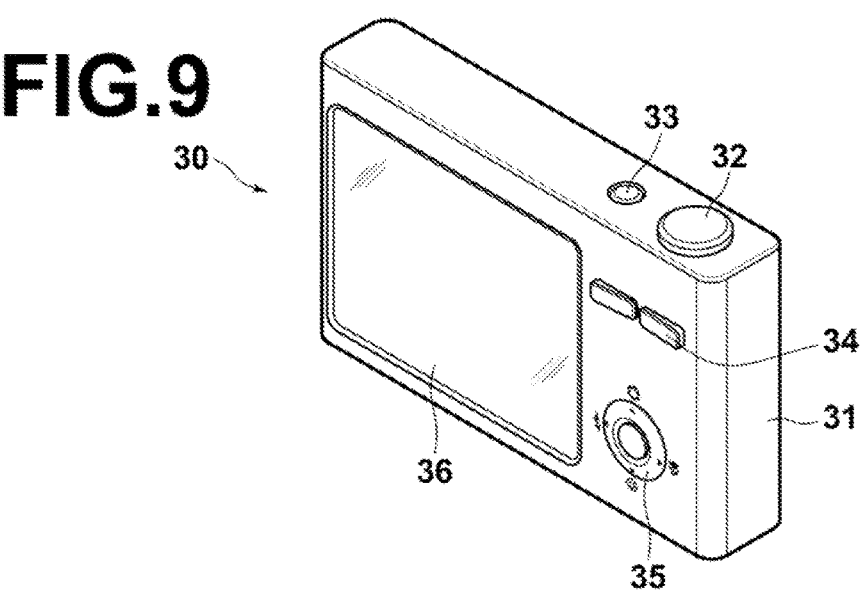
FIG. 9 is a perspective view that illustrates the rear side of the imaging apparatus illustrated in FIG. 8.

Next, an imaging apparatus according to an embodiment of the present disclosure will be described with reference to FIG. 8 and FIG. 9. FIG. 8 and FIG. 9 respectively are perspective views of the front and the rear of a camera 30. The camera 30 is a non reflex (so called mirrorless), onto which an exchangeable lens 20 is interchangeably mounted. The exchangeable lens 20 is a zoom lens 1 according to an embodiment of the present disclosure housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that receives images of subjects formed by the exchangeable lens 20 and outputs image signals corresponding to the images, a signal processing circuit (not shown) that processes the image signals output by the imaging element to generate images, and a recording medium (not shown) for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The camera 30 of the present embodiment is equipped with the zoom lens 1 of the present disclosure. Therefore, the camera 30 is capable of obtaining bright images having wide angles of view and high image quality.

The present disclosure has been described with reference to the embodiments and Examples thereof. However, the zoom lens of the present disclosure is not limited to the embodiments and Examples described above, and various modifications are possible. For example, the values of the radii of curvature of each lens component, the distances among surfaces, the refractive indices, the Abbe's numbers, and the aspherical surface coefficients may be changed as appropriate.

In addition, a non reflex digital camera was described as the embodiment of the imaging apparatus. However, the present disclosure is not limited to this application, and may be applied to other imaging apparatuses, such as a video camera, digital cameras other than those of the non reflex type, a cinematic camera, and a broadcast camera.

What is claimed is:
1. A zoom lens consisting of, in order from the object side to the image side:
   a first lens group having a positive refractive power;
   a second lens group having a negative refractive power;
   a third lens group having a positive refractive power, the third lens group consisting of, in order from the object side to the image side, a 3-1 positive lens, an aperture stop, a 3-2 cemented lens having a positive combined refractive power, a 3-3 cemented lens having a negative combined refractive power, and a 3-4 positive lens;

a fourth lens group having a negative refractive power; and a fifth lens group having a positive refractive power;

the distance between the first lens group and the second lens group constantly increasing, the distance between the second lens group and the third lens group constantly decreasing, the distance between the third lens group and the fourth lens group constantly changing, and the distance between the fourth lens group and the fifth lens group constantly increasing when changing magnification from the wide angle end to the telephoto end;

the first lens group consisting of, in order from the object side to the image side, a 1-1 negative lens, a 1-2 positive lens, and a 1-3 positive lens;

the second lens group consisting of, in order from the object side to the image side, a 2-1 negative meniscus lens having a concave surface toward the image side, a 2-2 negative lens, a 2-3 positive lens, a 2-4 positive lens, and a 2-5 negative lens; and the fifth lens group consisting of a single lens component.

2. A zoom lens as defined in claim 1, in which Conditional Formula (1) below is satisfied:

$$-0.9 < (L11f - L12r)/(L11f + L12r) < -0.1 \tag{1}$$

wherein L11f is the paraxial radius of curvature of the surface of the 1-1 negative lens toward the object side, and L12r is the paraxial radius of curvature of the surface of the 1-2 positive lens toward the image side.

3. A zoom lens as defined in claim 1, wherein:

the third lens group consists of four positive lenses, two negative lenses, and an aperture stop.

4. A zoom lens as defined in claim 1, wherein:

the 3-2 cemented lens is formed by cementing a negative lens and a biconvex lens, provided in this order from the object side to the image side, together.

5. A zoom lens as defined in claim 1, wherein:

the 3-3 cemented lens is formed by cementing a positive lens having a convex surface toward the image side and a biconcave lens, provided in this order from the object side to the image side, together.

6. A zoom lens as defined in claim 1, in which Conditional Formula (2) below is satisfied:

$$0.15 < f2/L22f < 1 \tag{2}$$

wherein f2 is the paraxial focal length of the second lens group with respect to the d line, and L22f is the paraxial radius of curvature of the surface of the 2-2 negative lens toward the object side.

7. A zoom lens as defined in claim 1, in which Conditional Formula (3) below is satisfied:

$$0.6 < f2/f21 < 1.3 \tag{3}$$

wherein f2 is the paraxial focal length of the second lens group with respect to the d line, and f21 is the paraxial focal length of the 2-1 negative lens with respect to the d line.

8. A zoom lens as defined in claim 1, in which Conditional Formula (4) below is satisfied:

$$0.7 < f3/f34 < 1.6 \tag{4}$$

wherein f3 is the paraxial focal length of the third lens group with respect to the d line, and f34 is the paraxial focal length of the 3-4 positive lens with respect to the d line.

9. A zoom lens as defined in claim 1, in which Conditional Formula (5) below is satisfied:

$$0.2 < f3/f31 < 1.5 \tag{5}$$

wherein f3 is the paraxial focal length of the third lens group with respect to the d line, and f31 is the paraxial focal length of the 3-1 positive lens with respect to the d line.

10. A zoom lens as defined in claim 1, wherein:

the fifth lens group is fixed with respect to an imaging surface when changing magnification.

11. A zoom lens as defined in claim 1, wherein:

the fifth lens group consists of a single lens; and

Conditional Formula (6) below is satisfied:

$$15 < vd5 < 40 \tag{6}$$

wherein vd5 is the Abbe's number of the single lens with respect to the d line.

12. A zoom lens as defined in claim 1, in which Conditional Formula (7) below is satisfied:

$$20 < vd31 < 40 \tag{7}$$

wherein vd31 is the Abbe's number of the 3-1 positive lens with respect to the d line.

13. A zoom lens as defined in claim 1, wherein:

only the fourth lens group is moved to perform focusing operations.

14. A zoom lens as defined in claim 1, in which Conditional Formula (1-1) below is satisfied:

$$-0.5 < (L11f - L12r)/(L11f + L12r) < -0.12 \tag{1-1}$$

wherein L11f is the paraxial radius of curvature of the surface of the 1-1 negative lens toward the object side, and L12r is the paraxial radius of curvature of the surface of the 1-2 positive lens toward the image side.

15. A zoom lens as defined in claim 1, in which Conditional Formula (3-1) below is satisfied:

$$0.7 < f2/f21 < 1.1 \tag{3-1}$$

wherein f2 is the paraxial focal length of the second lens group with respect to the d line, and f21 is the paraxial focal length of the 2-1 negative lens with respect to the d line.

16. A zoom lens as defined in claim 8, in which Conditional Formula (4-1) below is satisfied:

$$0.9 < f3/f34 < 1.5 \tag{4-1}$$

wherein f3 is the paraxial focal length of the third lens group with respect to the d line, and f34 is the paraxial focal length of the 3-4 positive lens with respect to the d line.

17. A zoom lens as defined in claim 1, wherein:

the fifth lens group consists of a single lens; and

Conditional Formula (6-1) below is satisfied:

$$16 < vd5 < 38 \tag{6-1}$$

wherein vd5 is the Abbe's number of the single lens with respect to the d line.

18. A zoom lens as defined in claim 12, in which Conditional Formula (7-1) below is satisfied:

$$25 < vd31 < 35 \tag{7-1}$$

wherein vd31 is the Abbe's number of the 3-1 positive lens with respect to the d line.

19. An imaging apparatus equipped with the zoom lens as defined in claim 1.

* * * * *